United States Patent [19]

Rideout

[11] 4,031,710

[45] June 28, 1977

[54] EMERGENCY COOLING SYSTEM FOR AIR-CONDITIONED VEHICLES

[76] Inventor: Marvin Rideout, 8 E. 83rd St., New York, N.Y. 10028

[22] Filed: Mar. 10, 1976

[21] Appl. No.: 665,580

[52] U.S. Cl. .................................. 62/171; 62/129; 62/244; 62/305

[51] Int. Cl.² .................. F28D 3/00; G01K 13/00; B60H 3/04; F28D 5/00

[58] Field of Search ............. 62/305, 244, 129, 171

[56] References Cited

UNITED STATES PATENTS

| | | | |
|---|---|---|---|
| 2,828,761 | 4/1958 | Weibert, Jr. ........................ | 62/171 |
| 3,383,045 | 5/1968 | Van Dyck ........................... | 62/305 |
| 3,926,000 | 12/1975 | Scofield ............................. | 62/305 |

Primary Examiner—Lloyd L. King
Attorney, Agent, or Firm—Allen D. Brufsky

[57] ABSTRACT

Apparatus mounted in a motor vehicle for cooling by evaporation the condenser of an air conditioning system in the vehicle. The apparatus includes a coolant tank in the vehicle having a pump to pump coolant to a manifold upon demand from which it is sprayed onto the condenser. A float in the tank activates a switch to stop the pump motor when the coolant level in the tank reaches a predetermined level.

3 Claims, 3 Drawing Figures

EMERGENCY COOLING SYSTEM FOR AIR-CONDITIONED VEHICLES

BACKGROUND OF THE INVENTION

This invention relates to a heat exchange apparatus, and more particularly, a heat exchange apparatus for use in an emergency to cool the condenser of an air conditioning system mounted in a motor vehicle.

In bumper to bumper traffic, the condenser in an air conditioner system in a motor vehicle receives higher than normal temperature and pressures therefore making it more difficult for refrigerant gas, which must be returned to a liquid state to be recirculated through the system. In order to maintain the heat exchange with ambient air to cool the refrigerant gas the motor vehicle engine must work harder to compress to pump the gas through the condenser, burning more fuel, and developing more heat which may result in overheating of the engine. Therefore, motor vehicle air conditioning systems are usually not operated under such traffic conditions.

SUMMARY OF THE INVENTION

This invention provides an apparatus mounted in a motor vehicle for temporarily alleviating the problem noted providing an auxiliary heat exchange means for cooling the air conditioning system condenser in heavy traffic conditions, so that the system may still be used without fear of engine overheating or higher fuel consumption.

In accordance with the invention, an auxiliary tank of coolant such as water is provided. A pump in the tank can be actuated at the discretion of the driver to pump coolant to a manifold. The manifold is provided with holes to disseminate the coolant in a spray over the air conditioning system condenser in heat exchange relation therewith to cool the refrigerant gas by evaporation thereby reducing the pressure and temperature of the refrigerant to decrease the load on the vehicle engine. A safety switch means is also provided in the auxiliary tank to shut the pump down if the coolant level in the tank is low to prevent the pump from running in a dry condition.

BRIEF DESCRIPTION OF THE DRAWING

Further objects and advantages of the invention will become more apparent from the following description and claims, and from the accompanying drawing wherein:

DETAILED DESCRIPTION OF THE PREFERRED EMBODIMENT

Figure 1:
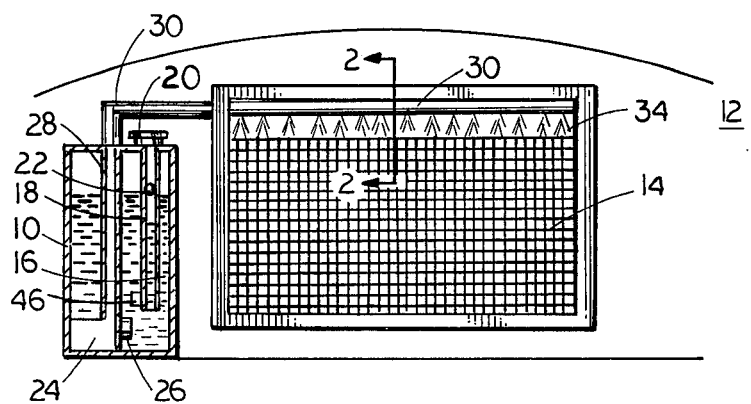
FIG. 1 is a side view in elevation, with parts in section, of the auxiliary heat exchange apparatus of the present invention mounted in a motor vehicle adjacent a condenser of the air conditioning system of the motor vehicle.
Figure 2:
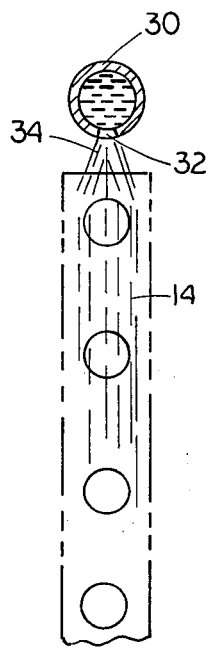
FIG. 2 is a cross-sectional view taken substantially along the plane indicated by line 2—2 of FIG. 1.

Referring now in detail to the drawing, wherein like numerals indicate like elements throughout the several views, an auxiliary coolant tank 10 is mounted in a motor vehicle 12 adjacent the condenser 14 of the air conditioning system in vehicle 12. While tank 10 is illustrated as being mounted adjacent condenser 14, it should be understood that it could be mounted in any convenient portion of vehicle 12, such as the trunk or any convenient space under the hood.

Tank 10 contains a supply of a coolant 16, such as water, which is poured into tank 10 through a pipe 18 closed by a cap 20. A float 22 of buoyant material is placed in pipe 18 after tank 10 is filled, for a purpose to be described hereinafter. Float 22 follows the water depth of coolant in tank 10.

A pump 24 is provided in tank 10 and has an inlet 26 in communication with the coolant 16 in tank 10. The outlet of pump 24 is connected to a pipe 28 connected to a horizontal manifold 30 exterior of tank 10. Manifold 30 is positioned above condenser 14 and includes spaced openings 32 along its length to disperse coolant 16 in a spray 34 over condenser 14 when pump 24 is acutated to cool the condenser by evaporation, when such cooling is desired by the operator of vehicle 12 as in heavy traffic conditions.

Figure 3:
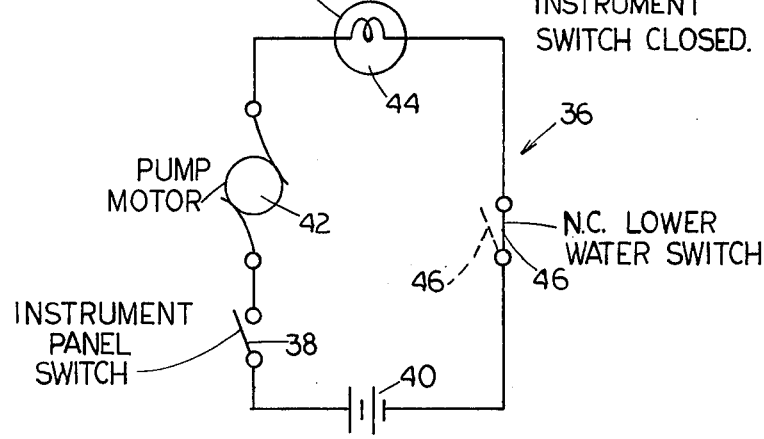
FIG. 3 is an electrical schematic diagram of an electrical circuit used with the apparatus of FIG. 1.

In order to actuate pump 24, an electric circuit 36, as shown in FIG. 3, is provided in vehicle 12. The circuit 36 includes a switch 38 on the dashboard of vehicle 12 which is connected to the battery 40 of vehicle 12. When closed, switch 38 establishes a series circuit from battery 40 to the motor 42 of pump 24 to actuate pump 24. A light 44 can be mounted on the instrument panel of vehicle 12 and is placed in series circuit 36 to indicate that the emergency cooling system has been activated.

A normally closed switch 46 can also be placed in series circuit 36. Switch 46 is mounted on inlet pipe 18 of tank 10 and has a contact arm adapted to be struck by float 22 to open the switch 46 when the level of coolant 16 drips in tank 10 so that the coolant has almost all been dispensed through manifold 30. Opening of switch 46 will render the circuit 36 inoperative to prevent pump 24 from running while tank 10 is dry. If switch 46 is opened and switch 38 closed but light 44 is inoperative, this will immediatelly indicate that tank 10 need to be refilled.

It should also be understood that manifold 30 need not be mounted directly above condenser 14. Manifold 30 can be mounted in front of condenser 14 and the radiator face or motion of vehicle 12 can draw the spray 34 against the condenser 14.

I claim:

1. Emergency cooling apparatus for a condenser of an air conditioning system of a motor vehicle comprising:
   a coolant tank;
   manifold means connected to said tank for spraying coolant from said tank on a condenser of an air conditioning system of a motor vehicle;
   pump means within said tank for supplying coolant from said tank to said manifold means;
   control means within said tank for rendering said pump means inoperative in response to the coolant in said tank being depleted below a predetermined level, and
   electric circuit means having a source of electric power and a first switch adapted to be mounted in a motor vehicle for activating said pump means in electrical series with said power source;
   said electric circuit means further including
   a second normally closed switch in electrical series with said first switch; and
   said control means including a float in said tank; and said second normally closed switch being mounted in said tank so as to be opened by said float when said float reaches said predetermined level in said tank.

2. Emergency cooling apparatus in accordance with claim 1 wherein:
said tank includes a filler pipe;
said float being disposed in said filler pipe; and
said second, normally closed switch being mounted on said filler pipe.

3. Emergency cooling apparatus in accordance with claim 2 wherein said electric circuit means includes a light adapted to be mounted in a motor vehicle in electrical series with said first switch for indicating operation of said pump means.

* * * * *